US010831893B2

(12) United States Patent
Schmugar et al.

(10) Patent No.: US 10,831,893 B2
(45) Date of Patent: Nov. 10, 2020

(54) MITIGATION OF RANSOMWARE

(71) Applicant: McAfee, LLC, San Jose, CA (US)

(72) Inventors: Craig D. Schmugar, Hillsboro, OR (US); Cedric Cochin, Portland, OR (US); Andrew Furtak, Beaverton, OR (US); Adam James Carrivick, Ashland (GB); Yury Bulygin, Beaverton, OR (US); John J. Loucaides, Forest Grove, OR (US); Oleksander Bazhaniuk, Sunnyvale, CA (US); Christiaan Beek, West-Linn, OR (US); Carl D. Woodward, Santa Clara, CA (US); Ronald Gallella, Beaverton, OR (US); Gregory Michael Heitzmann, Beaverton, OR (US); Joel R. Spurlock, Portland, OR (US)

(73) Assignee: McAfee, LLC, San Jose, CA (US)

(*) Notice: Subject to any disclaimer, the term of this patent is extended or adjusted under 35 U.S.C. 154(b) by 155 days.

(21) Appl. No.: 15/210,165

(22) Filed: Jul. 14, 2016

(65) Prior Publication Data

US 2018/0018458 A1   Jan. 18, 2018

(51) Int. Cl.
*G06F 21/56*   (2013.01)
*G06F 21/62*   (2013.01)
*G06F 21/55*   (2013.01)

(52) U.S. Cl.
CPC .......... *G06F 21/566* (2013.01); *G06F 21/554* (2013.01); *G06F 21/6218* (2013.01); *G06F 2221/2141* (2013.01)

(58) Field of Classification Search
CPC ............. H04L 63/1416; H04L 63/1441; H04L 63/145; H04L 63/1408; G06F 21/566;
(Continued)

(56) References Cited

U.S. PATENT DOCUMENTS 7,895,654 B1 * 2/2011 Millard ................. G06F 21/564
709/229
8,069,484 B2 * 11/2011 McMillan ............. G06F 21/563
713/194

(Continued)

OTHER PUBLICATIONS

Scaife et al, of CryptoLock (and Drop It): Stopping Ransomware Attacks on User Data, Jul. 11, 2016, IEEE, 10 Pages (Year: 2016).*

(Continued)

*Primary Examiner* — Christopher C Harris
(74) *Attorney, Agent, or Firm* — Patent Capital Group

(57) ABSTRACT

Particular embodiments described herein provide for an electronic device that can be configured to allow for the mitigation of ransomware. For example, the system can determine that an application begins to execute, determine that the application attempts to modify a file, determine a file type for the file, and create a security event if the application is not authorized to modify the file type. In another example, the system determines an entropy value between the file and the attempted modification of the file, and create a security event if the entropy value satisfies a threshold or determine a system entropy value that includes a rate at which other files on the system are being modified by the application, and create a security event if the system entropy value satisfies a threshold.

16 Claims, 7 Drawing Sheets

(58) Field of Classification Search
CPC .. G06F 2221/034; G06F 21/56; G06F 21/554; G06F 21/565; G06F 21/552
See application file for complete search history.

(56) References Cited

U.S. PATENT DOCUMENTS

| | | |
|---|---|---|
| 2005/0154738 A1* | 7/2005 | Thomas .................. G06F 21/52 |
| 2015/0058987 A1* | 2/2015 | Thure .................... G06F 21/554 726/23 |
| 2016/0180087 A1 | 6/2016 | Edwards et al. |
| 2017/0091453 A1 | 3/2017 | Cochin |

OTHER PUBLICATIONS

DSL Reports, How to Detect a Trojan Horse Virus, May 2, 2010, 1 Page (Year: 2010).*

* cited by examiner

MITIGATION OF RANSOMWARE

TECHNICAL FIELD

This disclosure relates in general to the field of information security, and more particularly, to the mitigation of ransomware.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
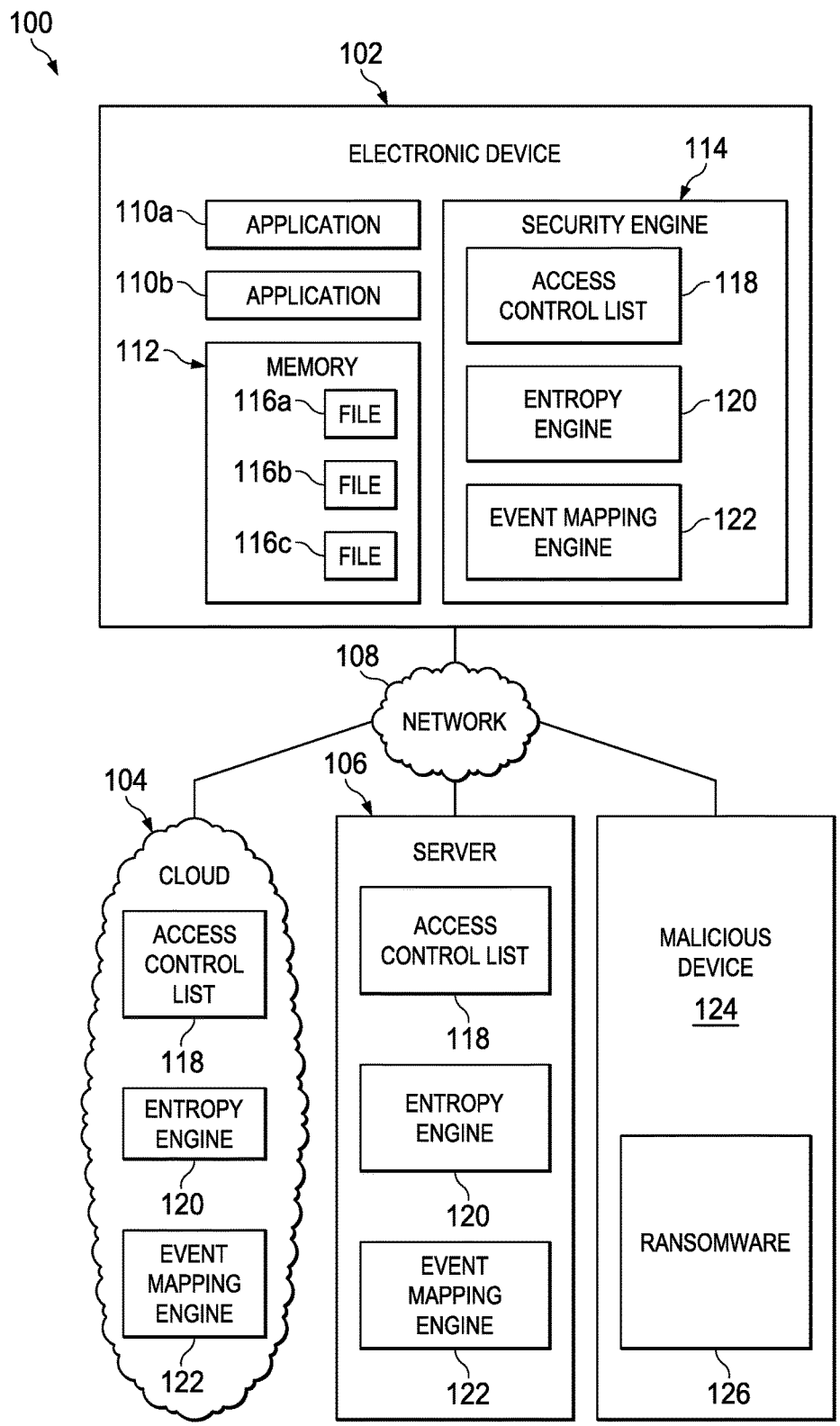
FIG. 1 is a simplified block diagram of a communication system for the mitigation of ransomware in accordance with an embodiment of the present disclosure.

FIG. 1 is a simplified block diagram of a communication system 100 for the mitigation of ransomware in accordance with an embodiment of the present disclosure. As illustrated in FIG. 1, an embodiment of communication system 100 can include electronic device 102, a cloud 104, and a server 106. Electronic device 102 can include one or more applications 110a and 110b, memory 112, and a security engine 114. Memory 112 can include one or more files 116a-116c. Security engine 114 can include an access control list 118, an entropy engine 120, and an event mapping engine 112. Cloud 104 and server 106 can each include access control list 118, entropy engine 120, and event mapping engine 122. Electronic device 102, cloud 104, and server 106 may be in communication using network 108. In an example, malicious device 124 can attempt to infect electronic device 102 with ransomware 126.

In an example, communication system 100 can be configured to determine that an application begins to execute, determine that the application accesses and attempts to modify a file, determine a file type for the file, and create a security event if the application is not authorized to modify the file type. An access control list that includes a list of files that the application is authorized to modify is at least partially used to determine if the application is not authorized to modify the file type. In another example, communication system 100 can be configured to determine an entropy value between the file and the attempted modification of the file, and create a security event if the entropy value satisfies a threshold. Also, communication system 100 can be configured to monitor activities of the application on a system that includes the file, determine a system entropy value that includes a rate at which other files on the system are being modified by the application, and create a security event if the system entropy value satisfies a threshold. In an example, the file is a bait file that was selected from preexisting files on a system and the security event was created when the application accessed and attempted to modify the file.

Elements of FIG. 1 may be coupled to one another through one or more interfaces employing any suitable connections (wired or wireless), which provide viable pathways for network (e.g., network 108) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Ransomware (e.g. ransomware 126) is a type of malware that restricts access to a computer system that it infects and demands a ransom paid to the creator(s) of the malware in order for the restriction to be removed. Some forms of ransomware encrypt files on the system's hard drive, while some may simply lock the system and display messages intended to coax the user into paying. Ransomware typically propagates as a trojan like a conventional computer worm, entering a system through, for example, a downloaded file or a vulnerability in a network service. The ransomware will then run a payload such as one that will begin to encrypt personal files on the hard drive. More sophisticated ransomware may hybrid-encrypt the victim's documents with a random symmetric key and a fixed public key and the malware author is the only party that knows the needed private decryption key.

Current security solutions (e.g., antivirus solutions, malware detection systems, etc.) often do not address the problem of files encrypted by ransomware. While some security solutions may detect the ransomware itself, they have no direct mechanism to protect the files, especially documents that the ransomware may encrypt. Some security solutions may attempt to restore the encrypted files as part of their malware repair but this is not possible in the case of an encryption using a private key that is not stored on the infected endpoint.

Some aspects of ransomware can be addressed with current security solutions upon detection of the malicious file. Upon detection, some security solutions can trigger a repair process and remove any artefact of the ransomware, including the simple lock that prevented the proper usage of the computer. However, when files have been encrypted and the private key needed for decryption is not present on the infected device, the security solution cannot restore the files that have been encrypted by the ransomware. As a result, the contents of files such as documents and images, (e.g., Microsoft® Office® files, images, PDFs, etc), are lost.

When compromising a system, ransomware typically encrypts user's documents and other important files. Detecting such encryption ransomware using deterministic mechanisms/signatures such as hashes of the files and processes may be challenging for new unknown ransomware and for ransomware which is using legitimate encryption and removal software to encrypt and remove the files. Additionally, the damage (e.g., loss of files) may already be done by the time security vendors learn about unknown ransomware and add detection signatures. What is needed is a system to improve protection of the documents and other types of files commonly targeted by ransomware on traditional endpoint systems from being manipulated (i.e. encrypted and removed) by ransomware.

A communication system for the mitigation of ransomware, as outlined in FIG. 1 can resolve these issues (and others). Communication system 100 may be configured to maintain an access control list or white-lists of applications which are allowed to modify certain types of documents and other types of files targeted by ransomware and prevent other processes or applications from modifying the monitored files.

Existing solutions may use deterministic mechanisms or signatures such as hashes of the files and processes to detect malware including ransomware. This requires the solution to know about the ransomware before it attacks a system. New or unknown ransomware cannot be detected or blocked by such solutions. The damage, or loss of files may already be done by the time security vendors learn about unknown ransomware and add detection signatures. Additionally, ransomware which is using legitimate encryption and removal software to encrypt and remove the files often times will not be detected or blocked by such solutions.

Communication system 100 can be configured to protect documents and other critical files from being modified or removed by encryption ransomware regardless of the type of ransomware, including unknown ransomware and ransomware using legitimate tools. In a specific example, communication system 100 can be configured to establish access control (e.g., using access control list 118) to documents or other critical types of files as well as document paths commonly targeted by ransomware. The system (e.g., event mapping engine 122) can then establish and maintain multiple white-lists (e.g., access control list 118) of applications which can modify specific types of such files and associate the white-lists with these types of files. A security application (e.g., security engine 114) can monitor attempts to modify files including write, rename, and remove such files and block modification attempts by processes or applications not in the white-list for the type of file being modified. The white-lists can be predefined for each type of monitored file, can be extended or updated after alerting the user, extended or updated dynamically based on the reputation of the process attempting to modify the file or its parent process, or could be created dynamically depending on the applications installed on a system. Upon detecting an attempt to modify monitored files by not white-listed applications, the system can block the attempt, prevent modification, alert the user or administrator of the system or save the original unmodified version of the file or only a change made to the file creating a version history of the monitored file to further manually or automatically restore the modified files when ransomware affects the system.

In another example, communication system 100 can be configured to define a monitoring process that uses behavioral heuristics to detect behavior symptomatic of ransomware regardless of the type of ransomware, such as ransomware implementing its own encryption functionality and ransomware using existing legitimate software to encrypt and remove files. Some of the behavioral heuristics can include monitoring (e.g., using entropy engine 120) the rate of modify/delete/rename operations with documents or other critical files commonly targeted by ransomware. The rate can be an exceeding configurable threshold over a time period, per process ID, or per executable binary. Other behavioral heuristics can include monitoring (e.g., using entropy engine 120) a number of modify/delete/rename operations documents or other critical files commonly targeted by ransomware. For example, if a number of operations exceeds some absolute threshold since the last OS boot, per process ID, etc. Another behavioral heuristic can include monitoring (e.g., using security engine 114) a change of the type/format of the file being written to by any application. Yet another behavioral heuristic can include monitoring (e.g., using entropy engine 120) changes in the entropy of the documents or other files such as per type of the document/file, average entropy over last number of operation or over a period of time. The entropy measurements may be done over a random number of blocks at random locations in the file. Also, a behavioral heuristic can include monitoring modify/delete/rename operations with randomly chosen existing user files that can be similar to bait files. Typically bait files are known files planted by an administrator. However, malware can be designed to avoid known bait files. By choosing random existing files as bait files and monitoring the files for modification, the malware cannot be designed to avoid the bait file.

Turning to the infrastructure of FIG. 1, communication system 100 in accordance with an example embodiment is shown. Generally, communication system 100 can be implemented in any type or topology of networks. Network 108 represents a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, cloud 104, and server 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic device 102, cloud 104, and server 106 can include memory elements (e.g., memory 112) for storing information to be used in the operations outlined herein. Each of electronic device 102, cloud 104, and server 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic device 102, cloud 104, and server 106 may include software modules (e.g., security engine 114, entropy engine 120, and event mapping engine 122) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, cloud 104, and server 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and include, for example, desktop computers, laptop computers, mobile devices, personal digital assistants, smartphones, tablets, or other similar devices. Cloud 104 can be configured to provide cloud services to electronic device 102. Cloud services may generally be defined as the use of computing resources that are delivered as a service over a network, such as the Internet. Typically, compute, storage, and network resources are offered in a cloud infrastructure, effectively shifting the workload from a local network to the cloud network. Server 106 can be a network element such as a server or virtual server and can be associated with clients, customers, endpoints, or end users wishing to initiate a communication in communication system 100 via some network (e.g., network 108). The term 'server' is inclusive of devices used to serve the requests of clients and/or perform some computational task on behalf of clients within communication system 100. Although security engine 114, entropy engine 120, and event mapping engine 122 are represented in FIG. 1 as being located in electronic device 102, cloud 104, and server 106 this is for illustrative purposes only. Security engine 114, entropy engine 120, and event mapping engine 122 could be combined or separated in any suitable configuration. Furthermore, security engine 114, entropy engine 120, and event mapping engine 122 could be integrated with or distributed in another network accessible by electronic device 102.

Figures 2, 3:
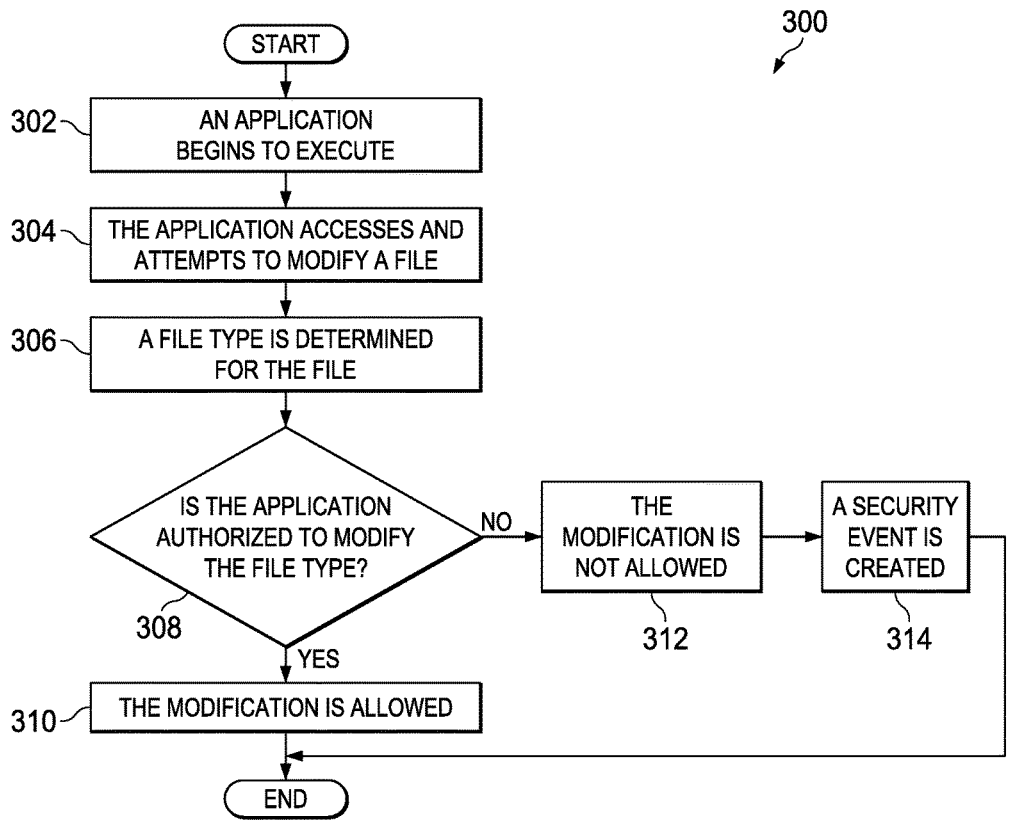
FIG. 2 is a simplified block diagram illustrating example details of a portion of a communication system for the mitigation of ransomware, in accordance with an embodiment of the present disclosure.
FIG. 3 is a simplified flowchart illustrating potential operations that may be associated with the communication system in accordance with an embodiment.

Turning to FIG. 2, FIG. 2 is a simplified block diagram illustrating example details of a portion of a communication system for the mitigation of ransomware, in accordance with an embodiment of the present disclosure. As illustrated in FIG. 2, access control list 118 can include a list of applications 110*a*-110*c*. For each application 110*a*-100*c*, an indicator can be used to indicate whether or not the application can modify the file. For example, an application 110*c* titled "calculator.exe" can modify file_A 116*d* and file_D 116*g* but not file_B 116*e* and file_C 116_F. An application 110*d* titled "viewer.exe" may be a viewer and is not allowed to modify file_A 116*d*, file_B 116*e*, file_C 116*f*, or file_D 116*g*. An application 110*e* titled "document.exe" may be a document processing program such as Word® and can be allowed to modify file_A 116*d*, file_B 116*e*, and file_D 116*g* but not file_C 116*f*. File_C 116*f* may be a system file that should not be modified by any application that is not a trusted system application.

Using access control list 118, access control to documents or other critical types of files can be established. Security engine 114 can monitor attempts to modify files including write, rename, and remove such files and block modification attempts by processes or applications that do not have the authority to modify a file.

Turning to FIG. 3, FIG. 3 is an example flowchart illustrating possible operations of a flow 300 that may be associated with mitigation of ransomware, in accordance with an embodiment. In an embodiment, one or more operations of flow 300 may be performed by security engine 114, access control list 118, entropy engine 120, and event mapping engine 122. At 302, an application begins to execute. At 304, the application accesses and attempts to modify a file. At 306, a file type is determined for the file. At 308, the system determines if the application is authorized to modify the file type. If the application is authorized to modify the file type, then the modification is allowed, as in 310. If the application is not authorized to modify the file type, then the modification is not allowed, as in 312. At 314, a security event is created. The security event can include flagging the application as potential malware, quarantining the application, blocking the application from execution, or some other remedial action to mitigate the potential of ransomware.

Figure 4A:
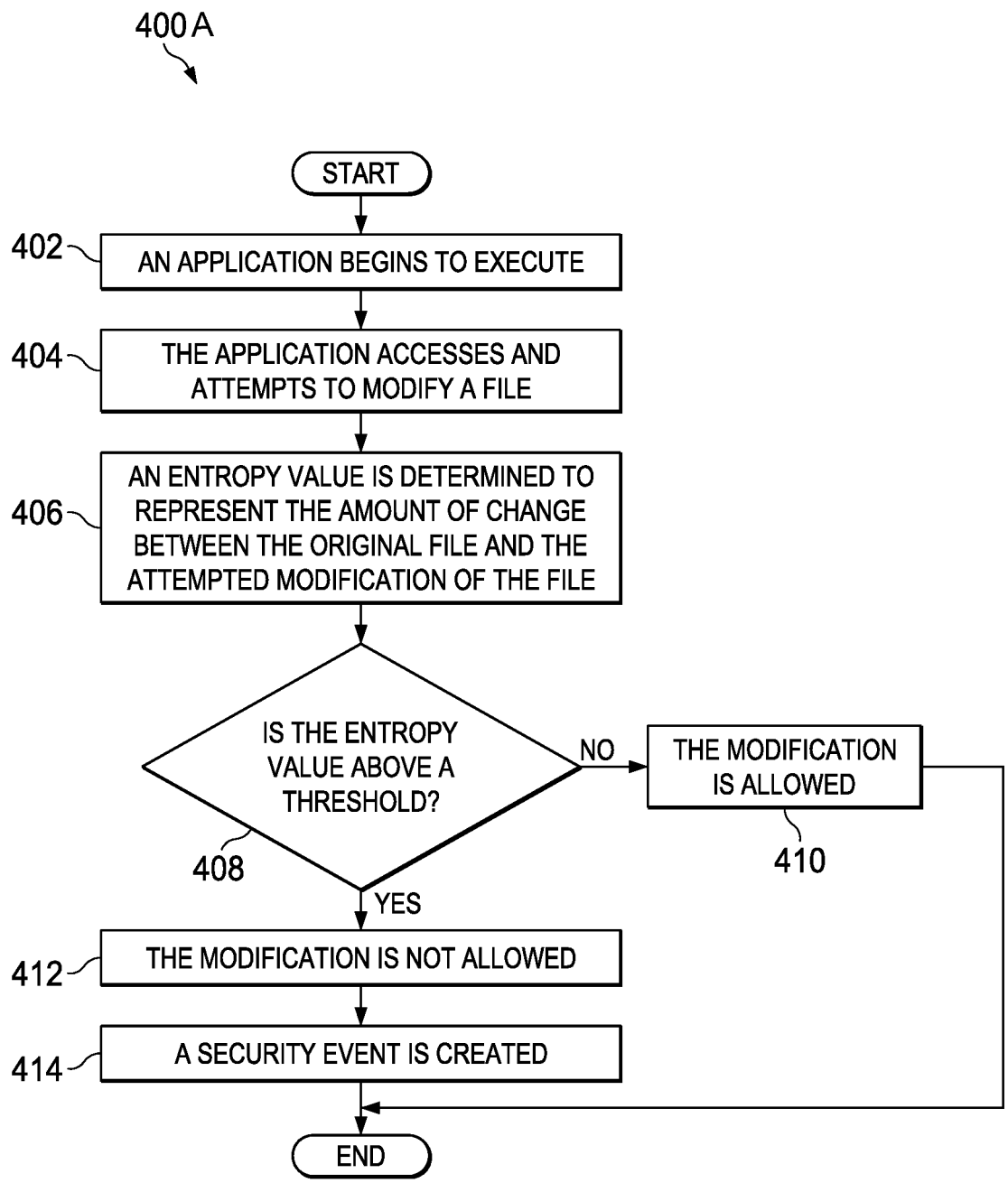
FIG. 4A is a simplified flowchart illustrating potential operations that may be associated with the communication system in accordance with an embodiment.

Turning to FIG. 4A, FIG. 4A is an example flowchart illustrating possible operations of a flow 400A that may be associated with mitigation of ransomware, in accordance with an embodiment. In an embodiment, one or more operations of flow 400A may be performed by security engine 114, access control list 118, entropy engine 120, and event mapping engine 122. At 402, an application begins to execute. At 404, the application accesses and attempts to modify a file. At 406, an entropy value is determined to represent the amount of change between the original file and the attempted modification of the file. At 408, the system determines if the entropy value is above a threshold. If the entropy value is not above a threshold, then the modification is allowed, as in 410. If the entropy value is above a threshold, then the modification is not allowed, as in 412. At 414, a security event is created. The security event can include flagging the application as potential malware, quarantining the application, blocking the application from execution, or some other remedial action to mitigate the potential of ransomware.

Figure 4B:
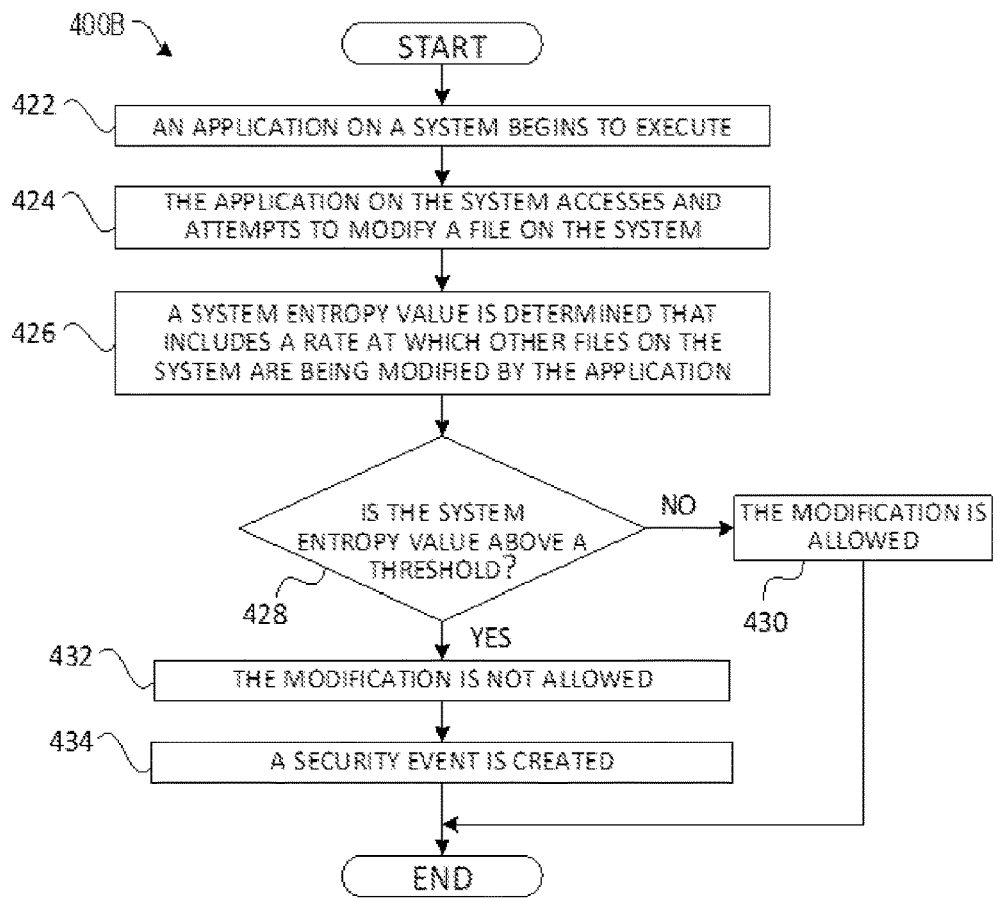
FIG. 4B is another simplified flowchart illustrating potential operations that may be associated with the communication system in accordance with an embodiment.

Turning to FIG. 4B, FIG. 4B is another example flowchart illustrating possible operations of a flow 400B that may be associated with mitigation of ransomware, in accordance with an embodiment. In an embodiment, one or more operations of flow 400B may be performed by security engine 114, access control list 118, entropy engine 120, and event mapping engine 122. At 422, an application on a system begins to execute. At 424, the application on the system accesses and attempts to modify a file on the system. At 426, a system entropy value is determined that includes a rate at which other files on the system are being modified by the application. At 428, the system determines if the system entropy value is above a threshold. If the entropy value is not above a threshold, then the modification is allowed, as in 430. If the system entropy value is above a threshold, then the modification is not allowed, as in 432. At 434, a security event is created. The security event can include flagging the application as potential malware, quarantining the application, blocking the application from execution, or some other remedial action to mitigate the potential of ransomware.

Figure 5:
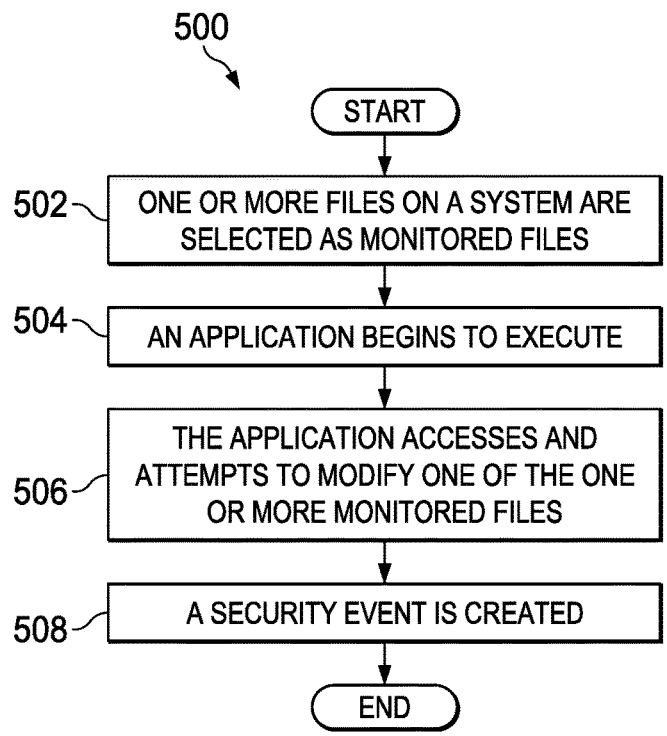
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with mitigation of ransomware, in accordance with an embodiment. In an embodiment, one or more operations of flow 500 may be performed by security engine 114, access control list 118, entropy engine 120, and event mapping engine 122. At 502, one or more files on a system are selected as monitored files. For example, the files may be existing files on the system that were created or last modified a predetermined amount of time in the past. Also, the files may be of a certain type or types such as Word® files, JPG files, or some other type of files that are not commonly modified, especially after a certain period of time. At 504, an application begins to execute. At 506, the application accesses and attempts to modify one of the one or more monitored files. At 508, a security event is crated. The security event is created because the selected file was acting as a bait file and modification of the file is not likely. The security event can include flagging the application as potential malware, quarantining the application, blocking the application from execution, or some other remedial action to mitigate the potential of ransomware.

Figure 6:
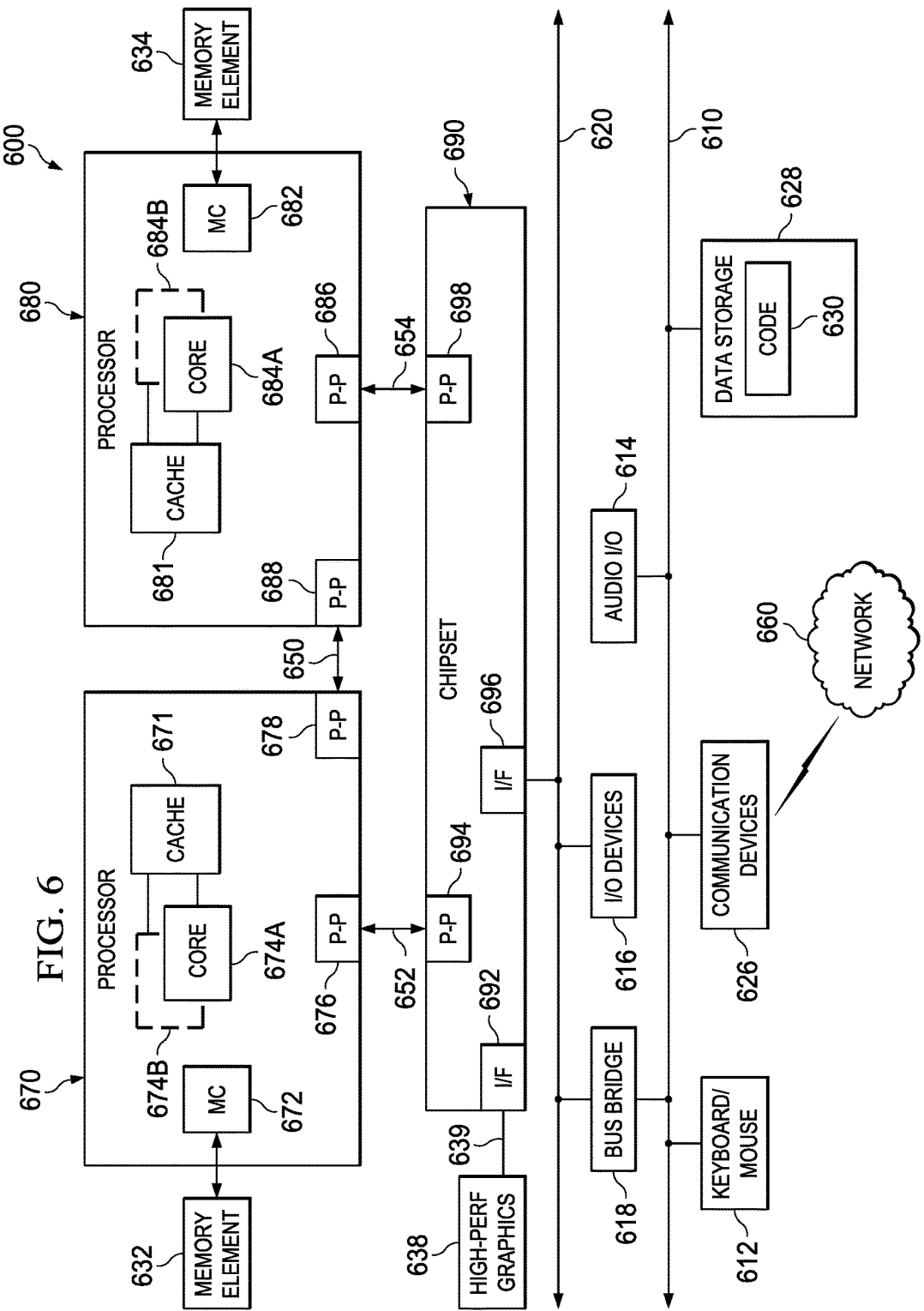
FIG. 6 is a block diagram illustrating an example computing system that is arranged in a point-to-point configuration in accordance with an embodiment.

Turning to FIG. 6, FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, one or more of the network elements of communication system 100 may be configured in the same or similar manner as computing system 600. More specifically, security engine 114, access control list 118, entropy engine 120, and event mapping engine 122 can be configured in the same or similar manner as computing system 500.

As illustrated in FIG. 6, system 600 may include several processors, of which only two, processors 670 and 680, are shown for clarity. While two processors 670 and 680 are shown, it is to be understood that an embodiment of system 600 may also include only one such processor. Processors 670 and 680 may each include a set of cores (i.e., processor cores 674A and 674B and processor cores 684A and 684B) to execute multiple threads of a program. The cores may be configured to execute instruction code in a manner similar to that discussed above with reference to FIGS. 1-5. Each processor 670, 680 may include at least one shared cache 671, 681. Shared caches 671, 681 may store data (e.g., instructions) that are utilized by one or more components of processors 670, 680, such as processor cores 674 and 684.

Processors 670 and 680 may also each include integrated memory controller logic (MC) 672 and 682 to communicate with memory elements 632 and 634. Memory elements 632 and/or 634 may store various data used by processors 670 and 680. In alternative embodiments, memory controller logic 672 and 682 may be discreet logic separate from processors 670 and 680.

Processors 670 and 680 may be any type of processor and may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
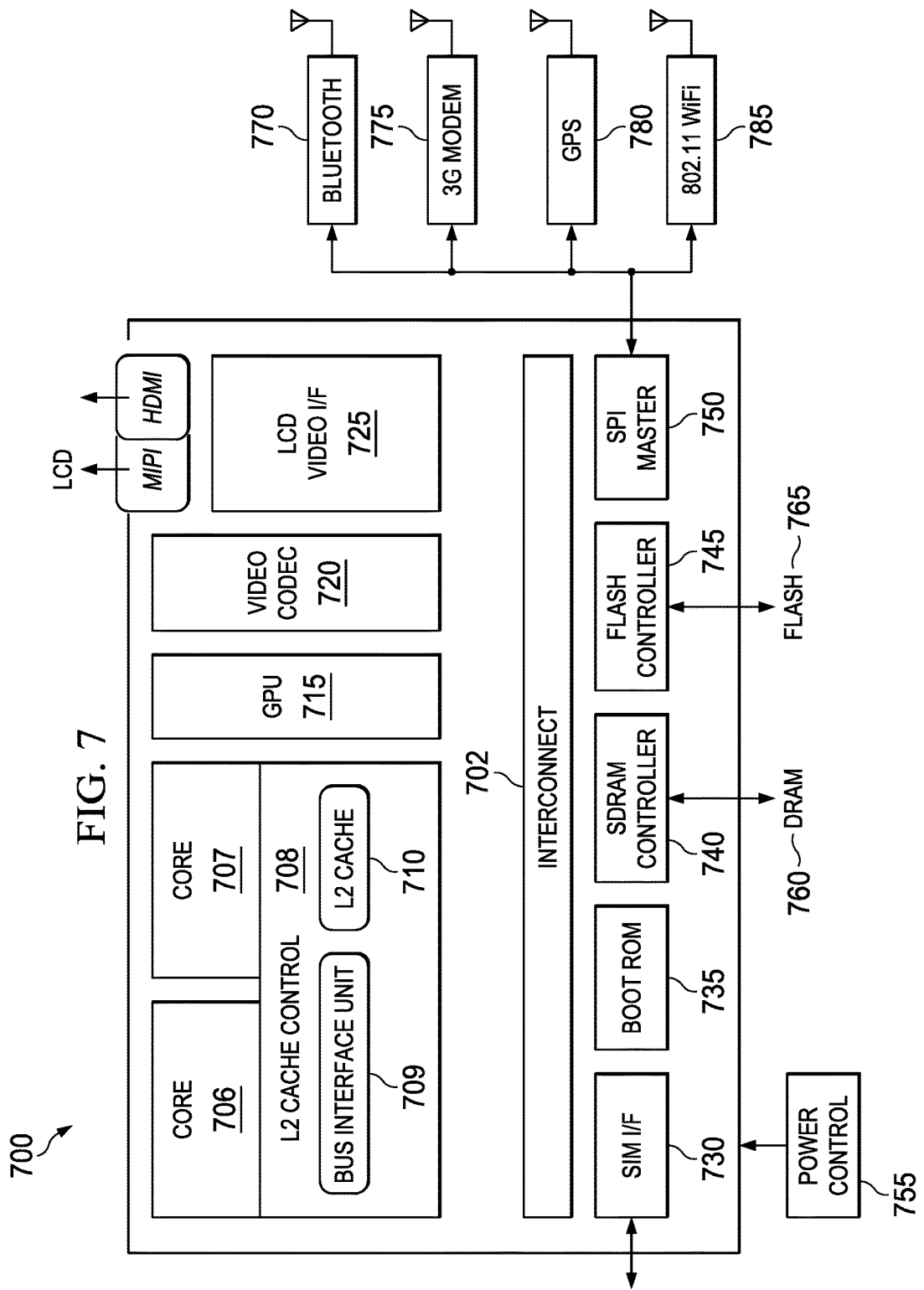
FIG. 7 is a simplified block diagram associated with an example system on chip (SOC) of the present disclosure.

Turning to FIG. 7, FIG. 7 is a simplified block diagram associated with an example SOC 700 of the present disclosure. At least one example implementation of the present disclosure can include the detection of malicious strings features discussed herein. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc. In an example, security engine 114, access control list 118, entropy engine 120, and event mapping engine 122 can be configured in the same or similar architecture as SOC 600.

In this example of FIG. 7, SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LCD.

SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more example embodiments include one or more communication capabilities, interfaces, and features such as instances of Bluetooth™ 770, a 3G modem 775, a global positioning system (GPS) 780, and an 802.11 Wi-Fi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
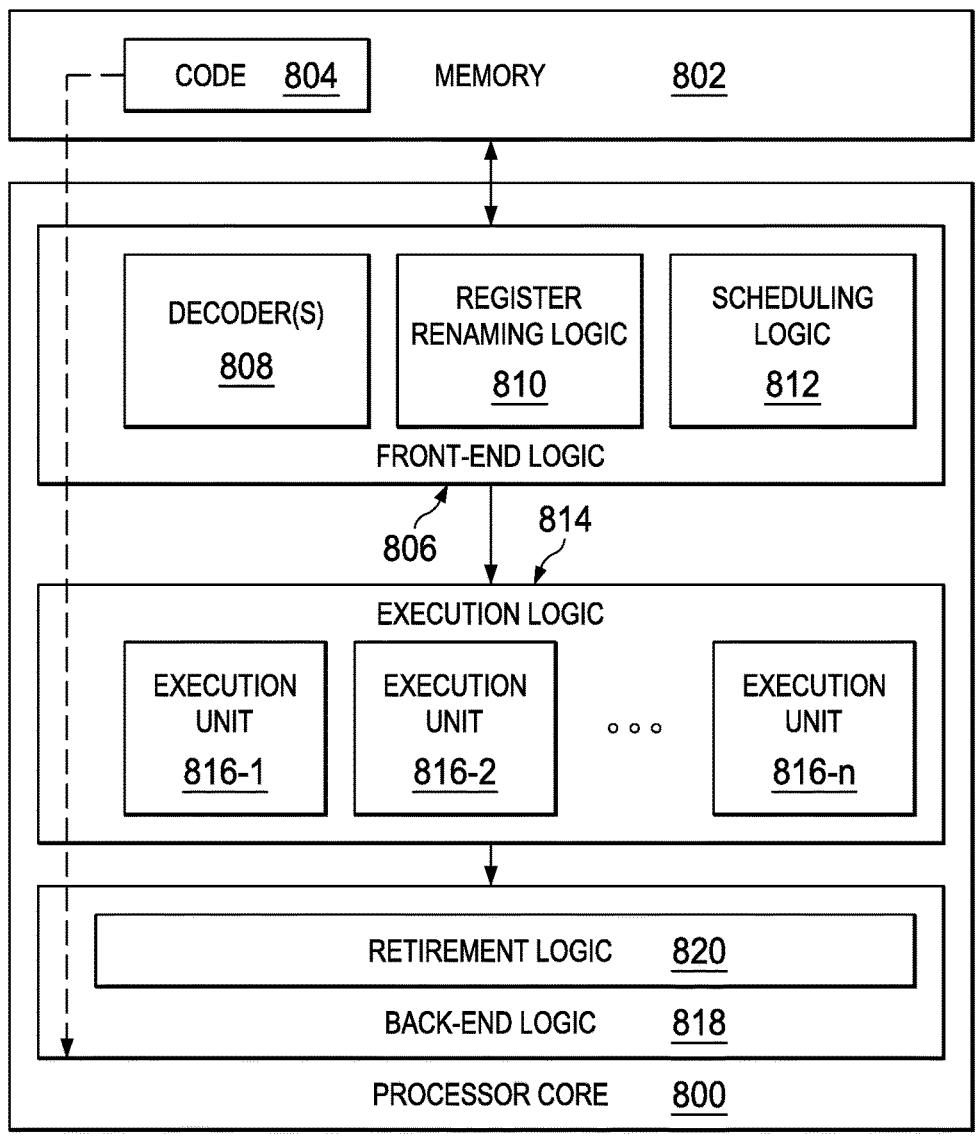
FIG. 8 is a block diagram illustrating an example processor core in accordance with an embodiment.

Turning to FIG. 8, FIG. 8 illustrates a processor core 800 according to an embodiment. Processor core 800 may be the core for any type of processor, such as a micro-processor, an embedded processor, a digital signal processor (DSP), a network processor, or other device to execute code. Although only one processor core 800 is illustrated in FIG. 8, a processor may alternatively include more than one of the processor core 800 illustrated in FIG. 8. For example, processor core 800 represents one example embodiment of processors cores 674a, 674b, 684a, and 684b shown and described with reference to processors 670 and 680 of FIG. 6. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 3-5) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable medium having one or more instructions that when executed by at least one processor cause the at least one processor to determine that an application begins to execute, determine that the application accesses and attempts to modify a file, determine a file type for the file, and create a security event if the application is not authorized to modify the file type.

In Example C2, the subject matter of Example C1 can optionally include one or more instructions that when executed by the at least one processor, further cause the processor to determine an entropy value between the file and the attempted modification of the file, and create a security event if the entropy value satisfies a threshold.

In Example C3, the subject matter of any one of Examples C1-C2 can optionally include where the file is a bait file that was selected from preexisting files on a system and the security event was created when the application accessed and attempted to modify the file.

In Example C4, the subject matter of any one of Examples C1-C3 can optionally include where an access control list that includes a list of files that the application is authorized to modify is at least partially used to determine if the application is not authorized to modify the file type.

In Example C5, the subject matter of any one of Examples C1-C4 can optionally include one or more instructions that when executed by the at least one processor, further cause the processor to monitor activities of the application on a system that includes the file, determine a system entropy value that includes a rate at which other files on the system are being modified by the application, and create a security event if the system entropy value satisfies a threshold.

In Example A1, an apparatus can include a processor, memory, and security engine, where the security engine is configured to determine that an application begins to execute, determine that the application accesses and attempts to modify a file, determine a file type for the file, and create a security event if the application is not authorized to modify the file type.

In Example, A2, the subject matter of Example A1 can optionally include an entropy engine, where the entropy engine is configured to determine an entropy value between the file and the attempted modification of the file and create a security event if the entropy value satisfies a threshold.

In Example A3, the subject matter of any one of Examples A1-A2 can optionally include where the file is a bait file that was selected from preexisting files on a system and the security event was created when the application accessed and attempted to modify the file.

In Example A4, the subject matter of any one of Examples A1-A3 can optionally further include where an access control list that includes a list of files that the application is authorized to modify is at least partially used to determine if the application is not authorized to modify the file type.

In Example A5, the subject matter of any one of Examples A1-A4 can optionally include an entropy engine, where the entropy engine is configured to determine a system entropy value that includes a rate at which other files on a system that includes the file are being modified by the application and create a security event if the system entropy value satisfies a threshold.

Example M1 is a method including determining that an application begins to execute, determining that the application accesses and attempts to modify a file, determining a file type for the file, and creating a security event if the application is not authorized to modify the file type.

In Example M2, the subject matter of Example M1 can optionally include determining an entropy value between the file and the attempted modification of the file and creating a security event if the entropy value satisfies a threshold.

In Example M3, the subject matter of any one of the Examples M1-M2 can optionally include where the file is a bait file that was selected from preexisting files on a system and the security event was created when the application accessed and attempted to modify the file.

In Example M4, the subject matter of any one of the Examples M1-M3 can optionally include where an access control list that includes a list of files that the application is authorized to modify is at least partially used to determine if the application is not authorized to modify the file type.

In Example M5, the subject matter of any one of the Examples M1-M4 can optionally include monitoring activities of the application on a system that includes the file, determining a system entropy value that includes a rate at which other files on the system are being modified by the application, and creating a security event if the system entropy value satisfies a threshold.

Example S1 is a system for the mitigation of ransomware, the system including a security engine, the security engine configured to determine that an application begins to execute, determine that the application accesses and attempts to modify a file, determine a file type for the file, and create a security event if the application is not authorized to modify the file type.

In Example S2, the subject matter of Example S1 can optionally include an entropy engine, where the entropy engine is configured to determine an entropy value between the file and the attempted modification of the file, and create a security event if the entropy value satisfies a threshold.

In Example S3, the subject matter of any of the Examples S1-52 can optionally include where the file is a bait file that was selected from preexisting files on a system and the security event was created when the application accessed and attempted to modify the file.

In Example S4, the subject matter of any of the Examples S1-S2 can optionally include where an access control list that includes a list of files that the application is authorized to modify is at least partially used to determine if the application is not authorized to modify the file type.

In Example S5 the subject matter of any of the Examples S1-S2 can optionally include where an entropy engine, where the entropy engine is configured to determine a system entropy value that includes a rate at which other files on a system that includes the file are being modified by the application and create a security event if the system entropy value satisfies a threshold.

Example X1 is a machine-readable storage medium including machine-readable instructions to implement a method or realize an apparatus as in any one of the Examples A1-A5, or M1-M5. Example Y1 is an apparatus comprising means for performing of any of the Example methods M1-M5. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory computer-readable medium comprising one or more instructions that when executed by at least one processor, cause the at least one processor to:
    determine that an application on a system begins to execute;
    determine that the application accesses and attempts to modify a file on the system;
    determine an entropy value that includes a rate at which the file is being modified by the application, wherein the entropy value is based on a random number of blocks at random locations in the file; and
    create a security event based on a determination that the entropy value satisfies a threshold.

2. The at least one computer-readable medium of claim 1, wherein the entropy value represents the rate at which the file is being modified by the application over a time period, and wherein the time period is the time since the last operating system (OS) boot, or the time period since the file was created or last modified.

3. The at least one computer-readable medium of claim 1, further comprising one or more instructions that when executed by the at least one processor, further cause the processor to:
    determine if the application is not authorized to modify the file based on an access control list that includes a list of files that the application is authorized to modify.

4. The at least one computer-readable medium of claim 1, further causing the at least one processor to:
    determine a system entropy value that includes a rate at which other files on the system are being modified by the application, wherein the other files on the system used to determine the system entropy value are chosen randomly and are monitored for modification by the application; and
    create a security event based on a determination that the system entropy value satisfies a threshold.

5. An apparatus comprising:
    a memory element operable to store instructions; and
    a processor operable to execute the instructions, such that the apparatus is configured to:
    determine that an application on a system begins to execute;
    determine that the application accesses and attempts to modify a file on the system;
    determine an entropy value that includes a rate at which the file is being modified by the application, wherein the entropy value is based on a random number of blocks at random locations in the file; and create a security event based on a determination that the system entropy value satisfies a threshold.

6. The apparatus of claim 5, further comprising:
determine if the application is not authorized to modify the file based on an access control list that includes a list of files that the application is authorized to modify.

7. The apparatus of claim 4, wherein the entropy value represents the rate at which the file is being modified by the application over a time period, and wherein the time period is the time since the last operating system (OS) boot, or the time period since the file was created or last modified.

8. The apparatus of claim 4, further configured to:
determine a system entropy value that includes a rate at which other files on the system are being modified by the application, wherein the other files on the system used to determine the system entropy value are chosen randomly and are monitored for modification by the application; and
create a security event based on a determination that the system entropy value satisfies a threshold.

9. A method comprising:
determining that an application on a system begins to execute;
determining that the application accesses and attempts to modify a file on the system;
determining an entropy value that includes a rate at which the file is being modified by the application, wherein the entropy value is based on a random number of blocks at random locations in the file; and
creating a security event based on a determination that the system entropy value satisfies a threshold.

10. The method of claim 9, further comprising:
determining if the application is not authorized to modify the file based on an access control list that includes a list of files that the application is authorized to modify.

11. The method of claim 9, wherein the entropy value represents the rate at which the file is being modified by the application over a time period, and wherein the time period is the time since the last operating system (OS) boot, or the time period since the file was created or last modified.

12. The method of claim 9, further comprising:
determining a system entropy value that includes a rate at which other files on the system are being modified by the application, wherein the other files on the system used to determine the system entropy value are chosen randomly and are monitored for modification by the application; and
creating a security event based on a determination that the system entropy value satisfies a threshold.

13. A system for the mitigation of ransomware, the system comprising:
a security engine, comprising:
a processor; and
a memory storing executable instructions that when executed by the processor cause the processor to:
determine that an application on a system begins to execute;
determine that the application accesses and attempts to modify a file on the system;
determine an entropy value that includes a rate at which the file is being modified by the application, wherein the entropy value is based on a random number of blocks at random locations in the file; and
create a security event based on a determination that the entropy value satisfies a threshold.

14. The system of claim 13, further comprising:
determine if the application is not authorized to modify the file based on an access control list that includes a list of files that the application is authorized to modify.

15. The system of claim 13, wherein the entropy value represents the rate at which the file being modified by the application over a time period, and wherein the time period is the time since the last operating system (OS) boot, or the time period since the file was created or last modified.

16. The system of claim 13, further comprising:
determine a system entropy value that includes a rate at which other files on the system are being modified by the application, wherein the other files on the system used to determine the system entropy value are chosen randomly and are monitored for modification by the application; and
create a security event based on a determination that the system entropy value satisfies a threshold.

* * * * *

UNITED STATES PATENT AND TRADEMARK OFFICE
CERTIFICATE OF CORRECTION

PATENT NO. : 10,831,893 B2
APPLICATION NO. : 15/210165
DATED : November 10, 2020
INVENTOR(S) : Craig Schmugar et al.

It is certified that error appears in the above-identified patent and that said Letters Patent is hereby corrected as shown below:

In the Claims

In Column 15, Line 7, in Claim 7, delete "claim 4," and insert -- claim 5, --, therefor.

In Column 15, Line 12, in Claim 8, delete "claim 4" and insert -- claim 5 --, therefor.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*